Dec. 9, 1958     J. PARSTORFER     2,863,336
APPARATUS FOR ACTUATING SEALED INSTRUMENTS
Filed Sept. 7, 1956

INVENTOR.
JOHN PARSTORFER
BY
AGENT

United States Patent Office 2,863,336
Patented Dec. 9, 1958

2,863,336

APPARATUS FOR ACTUATING SEALED INSTRUMENTS

John Parstorfer, Philadelphia, Pa., assignor to Burroughs Corporation, Detroit, Mich., a corporation of Michigan Application September 7, 1956, Serial No. 608,590

7 Claims. (Cl. 74—804)

The present invention relates to motion transmitting devices and more particularly to novel apparatus for controlling instruments housed in hermetically sealed casings.

The operation of instruments such as potentiometers, relays, transistor equipped circuits, and other electrical components used in present day complicated electrical and magnetic systems, such for example as computers, when such instruments are housed in a hermetically sealed casing, has presented the problem of making adjustments to such instruments from the outside of the housing without destroying the seal. In the past packings of various kinds of stuffing boxes have been tried, but without success.

It is an object of the present invention to provide a novel control device overcoming the foregoing problem.

Another object is to provide a mechanism, operable from the exterior of a sealed chamber or casing, which can accurately adjust or regulate instruments within the chamber.

A further object is to provide a novel mechanism for controlling instruments in a hermetically sealed casing wherein manually operable means on the outside of the casing is operably associated with motion transmitting means within the casing in a manner preserving the sealed condition of the casing.

More specifically it is an object of the invention to provide such a device which is characterized by its adaptability for economical manufacture in small sizes, and its simple yet rugged construction and assembly.

Figure 1:
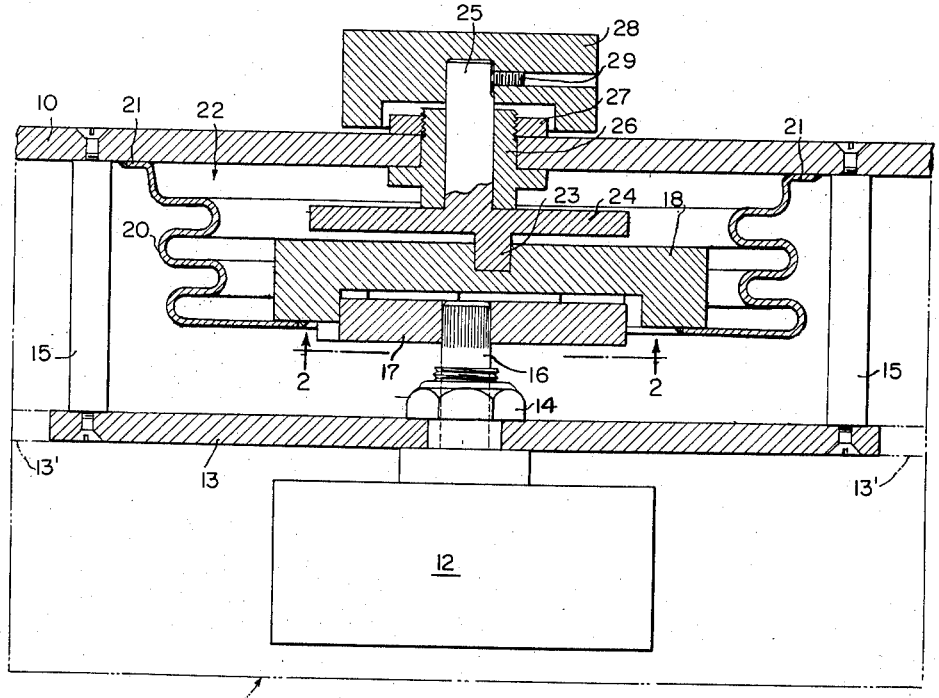
Figure 2:
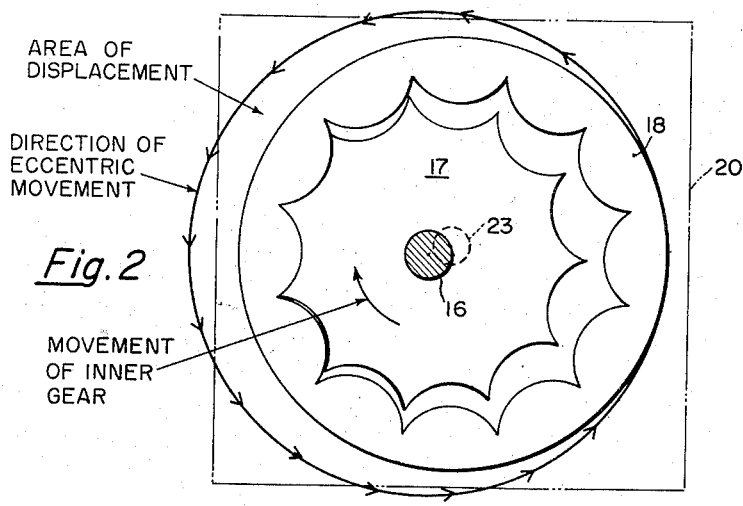

In the accompanying drawings:

Figure 1 is a medial horizontal sectional view of apparatus embodying one form of the invention; and Figure 2 is a sectional view taken on line 2—2 of Figure 1.

Referring to Figure 1 of the drawings, one form of apparatus embodying the concepts of the present invention is shown mounted on a panel 10 which may be the front frame of an instrument casing as shown in broken lines 11, or which may form a part of the instrument itself, in which case it would be sealed to casing 11. It is to be understood that casing 11 forms a sealed housing for electrical apparatus, such as potentiometers, transistor controlled units and other sensitive instrumentalities to be shielded from ambient atmospheric conditions. With such sealed-in instruments there has been the problem of making adjustments to instruments within the hermetically sealed casing.

Representative of one use of the invention as a solution to this problem, a potentiometer 12 is shown mounted, as by nut 14, upon a subpanel attached in parallel spaced relation to panel 10 by suitable spacers 15, while the potentiometer adjusting spindle 16 passes through the subpanel 13 for attachment to its operating mechanism, now to be described.

For transmitting torque to the potentiometer spindle 16, an externally toothed spur gear 17 is keyed to spindle 16 and arranged for partial circumferential meshing with the teeth of a cup type internally toothed gear 18 encirculating gear 17 but eccentrically positioned relative to the axis thereof. Preferably the teeth of gear 17 are formed by involute arcs which coact with the complementary teeth of gear 18 in a manner whereby eccentric shifting of gear 18 will force the teeth or prongs of gear 17 to be cammed rotatably. In the present instance, gear 18 has one more tooth than gear 17 for ratio operation as will be explained hereinafter.

In order to actuate gear 17 to rotate the potentiometer spindle 16, internal gear 18 is circumferentially supported by and attached to one end of a bellows 20 and provides a closure for said bellows which has its other end welded or otherwise made fast, as indicated at 21, to the inner face of panel 10, thereby to form a compartment 22 entirely sealed from the interior of casing 11 in which the sensitive instruments are located. Gear 18 is arranged to be shifted bodily through a planar circle so that it functions as a wobble gear. For effecting this motion of gear 18, the back plate of the gear pivotally receives a pin 23 projecting laterally from a disc 24 but eccentric to its drive shaft 25. Shaft 25 traverses a flanged bearing 26 fixed in panel 10 by nut 27 while its projecting end may, if desired, be provided with an instrument adjusting knob 28 fixed thereto by a set screw 29. Alternatively, the end of the shaft may be provided with a slot or the like for turning thereof with an instrument, such as a screw driver. In this connection it should be understood that shaft 25 is coaxially aligned with potentiometer spindle 16, while the eccentricity of pin 23 is preferably such that it generates a circle of relatively small diameter, and serves to keep gears 17 and 18 in proper engagement throughout their operation.

From the foregoing it will be seen that rotation of knob 28 will cause gear 18 to wobble within a planar circle which movement, when transmitted to gear 17, causes a continuous camming of gear 17, resulting in slow but smooth rotation of shaft 16 to operate or adjust potentiometer 12. As an example, in the present assembly, the ratio of the teeth or camming members of the gears 17 and 18 is chosen 12 to 11 whereby displacement of gear 18, as described above, results in continuous rotation of gear 17 at a converted ratio of 11 to 1. As a consequence the potentiometer spindle 16 will turn only 30° while control knob 28 is turned a full rotation of 360°. By this step-down construction a very sensitive vernier adjustment of the potentiometer or other instrument is made possible. During such movements bellows 20 flexes and thus follows gear 18 to maintain the tight seal of casing 11. It should be noted that the distance between disk 24 and gear 17 is such as to guide the wobble movements of gear 18.

In summary, it is now seen that the motion transmitting elements in this embodiment of the invention are confined in an auxiliary chamber 22 sealed off from the interior of the instrument compartment, such elements including an eccentrically mounted internal gear 18 as a part of a bellows 20 which forms the auxiliary chamber, in combination with a spur gear drive means 17 for the instrument 12. In this assembly rotation of control knob 28 causes eccentric gear 18 in conjunction with the flexible bellows 20, to shift bodily with a wobble motion and in a planar circle, and thereby retard its meshing spur gear 17 a distance equal to one tooth for each complete rotation of shaft 25, or in the present ratio turn the instrument spindle one eleventh of a revolution for each complete revolution of shaft 25 and in a direction opposite to the direction of movement of gear 18. Thus it is seen that a rotating motion of knob 28 on the outside of casing 11 is converted to an eccentric motion in chamber 22, and that the eccentric motion is in turn converted into a circular shifting motion (wobble), and finally the latter motion is changed to a continuous rotation of shaft 16 inside sealed chamber 11.

The unit may be completely balanced by adding counter-weight to disk 24 at a position opposite to eccentric 23 and sufficient accurately to balance both the weight of the pin in proportion to its distance from the axis of shaft 25, and the shifted weight of wobble gear 18, so that the adjusted position of the mechanism will not shift or be disturbed by shock or vibration.

It will now be apparent that a simple yet rugged assembly has been devised wherein rotary motion of a turning or adjusting element on the exterior of a hermetically sealed cabinet or casing is translated to an instrument housed therein without exposing the instrument to atmospheric conditions.

What is claimed is:

1. Apparatus for transmitting rotary motion into a sealed casing comprising a first rotatable shaft mounted within said casing, a second rotatable shaft mounted externally of said casing, gear means comprising an internal gear and a meshing external gear, said external gear being secured to said first shaft, flexible sealing means attached between said casing and said internal gear and supporting the latter, and eccentric means interconnecting said second shaft and said internal gear whereby rotation of said second shaft will move said internal gear in a manner to cause rotation of said external gear and said first shaft.

2. Apparatus for transmitting rotary motion into a sealed casing comprising a first shaft rotatably mounted within said casing, a second rotatably mounted shaft accessible from the exterior of said casing, a wobble gear comprising an external gear secured to said first shaft and an internal gear, eccentric means interconnecting said second shaft and said internal gear whereby rotation of said second shaft will move said internal gear in a manner to cause rotation of said external gear and said first shaft, and flexible sealing means attached between said casing and said internal gear.

3. Apparatus for transmitting rotary motion into a sealed casing comprising, a first shaft, means rotatably mounting said first shaft within said casing, a second shaft rotatably mounted exteriorly of said casing and axially aligned with said first shaft, a wobble gear comprising intermeshing internal and external gears, said external gear being secured to said first shaft, a flexible metallic bellows sealed at one end to said casing and at its other end to said internal gear to support the latter, eccentric means interconnecting said second shaft and said internal gear whereby rotation of said shaft will shift said internal gear bodily in a planar circle thus to cause rotation of said external gear and said first shaft.

4. A motion transmitting assembly comprising the combination of a sealed casing, an instrument in said casing having an operating shaft, a drive shaft projecting from said casing in axial alignment with said operating shaft, manually operable means for rotating said drive shaft, an external gear on said operating shaft, a flexible bellows in said casing attached at one end to said casing to encircle the inner end of said drive shaft, a closure sealing the other end of said bellows, an internal gear carried by said closure in mesh with said external gear, and means eccentrically mounted on said shaft for wobbling said closure and its internal gear whereby said external gear rotates said instrument shaft.

5. A motion transmitting assembly according to claim 3, wherein the ratio of the teeth of said gears rotates the external gear an angular distance equal to one tooth for each complete revolution of said drive shaft.

6. A motion transmitting unit for attachment to a sealed casing containing instruments sensitive to atmospheric conditions comprising, a panel on said casing, a drive shaft projecting exteriorly through said panel, a sub-panel spaced from said casing panel, an operating shaft through said sub-panel in axial alignment with said drive shaft, an external gear, an internal gear, means mounting said internal gear for eccentric meshing with said external gear, flexible means carried by said panel for supporting said internal gear for wobbling motion, and means for rotating said eccentric means, whereby said operating shaft is given a predetermined rotation.

7. A motion transmitting unit according to claim 5 wherein the flexible means is a bellows.

References Cited in the file of this patent

UNITED STATES PATENTS

| | | |
|---|---|---|
| 2,495,811 | Hollman | Jan. 31, 1950 |
| 2,497,867 | Cymmer | Feb. 21, 1950 |
| 2,551,847 | Nelson | May 8, 1951 |
| 2,742,790 | Nelson | Apr. 24, 1956 |